June 13, 1961   L. DE LUCA   2,988,408
WHEEL HUB AND AXLE CONSTRUCTION
Filed Oct. 10, 1957
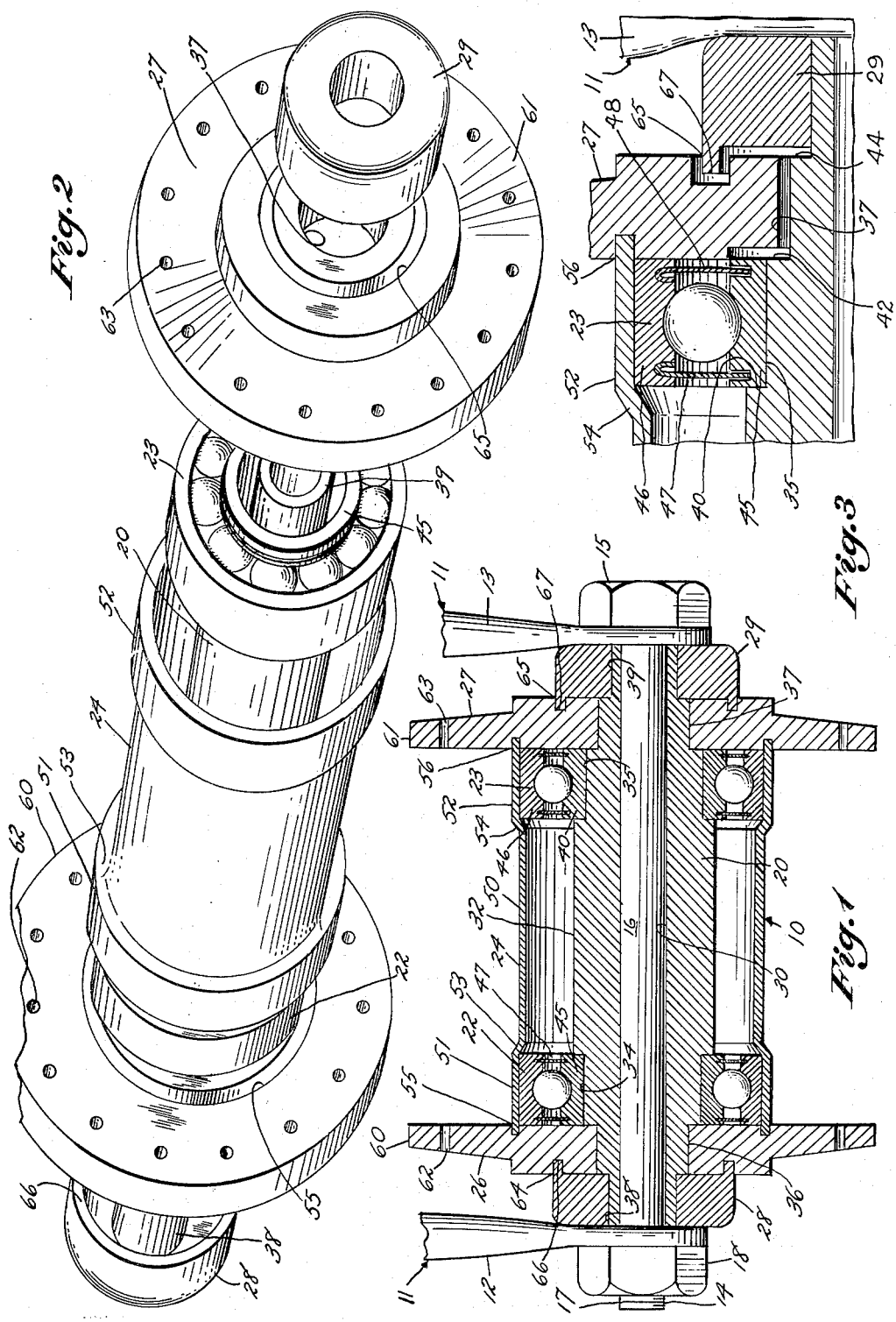

2,988,408
WHEEL HUB AND AXLE CONSTRUCTION
Louis De Luca, 2372 Webster Ave., New York, N.Y.
Filed Oct. 10, 1957, Ser. No. 689,442
2 Claims. (Cl. 308—191)

This invention relates generally to wheel hub and axle construction, and more particularly to improvement in hub and axle construction especially suited for racing sulkies and the like.

In the case of racing sulkies, and similar vehicles, since the driving power is low and speed is essential, it is most important that the wheel rotate freely about the axle, with low friction and high dependability.

It is therefore among the objects of the present invention to provide structure which will be substantially sealed.

Another object herein lies in the provision of structure of the class described which will maintain a quantity of lubricant in the bearings thereof so that no additional lubrication is required. This is of definite value in that no care is required.

Another object herein lies in the provision of a device of the nature described which will give long trouble-free service even when used under adverse weather conditions. Thus when the sulky is driven in rain or mud, or under very dirty track conditions, the entrance of sand, dirt and water into the hub and bearings is kept at a minimum.

A still further object lies in the provision of hub and axle structure, which while affording the foregoing advantages, will be strong and light in weight.

These objects and other incidental ends and advantages will more fully appear in the course of the present disclosure and be pointed out in the appended claims.

In the drawings, similar reference characters designate corresponding parts throughout the several views.

FIGURE 1 is a vertical sectional view of a preferred embodiment of the invention.

FIGURE 2 is an enlarged perspective view, partially exploded, with certain of the parts removed for clarity.

FIGURE 3 is an enlarged fragmentary sectional view with exaggerated separation between relatively fixed and moving parts.

Depending upon the nature of the vehicle with which the present invention is used, any desired number of wheel, hub and axle assemblies may be used. In the usual racing sulky or jog cart, two are used, and of such, one is illustrated in the accompanying drawings.

As seen in FIGURE 1, the fork element 11 may have two fork members 12 and 13 in which is mounted the axle element 14. The axle element may be in the form of a metal bolt, preferably steel, having a head 15, a body 16, and a threaded end 17. The end 17 is provided with a nut 18, and in order to prevent undesired loosening of the bolt, suitable means well known in the art may be provided, such as castellated nut with a cotter pin or the like (not shown), or the thread is arranged so that the nut tightens as the wheel rotates in a forward direction. The lower ends of the fork members 12 and 13 are provided with holes in which the body 16 is disposed.

The hub unit, generally indicated by reference character 10 includes broadly a relatively stationary axle sleeve element 20; bearings 22 and 23; a housing element 24; wheel or spoke ring elements 26 and 27, and retaining seal ring elements 28 and 29.

The axle sleeve element 20 is made of a strong durable material which is light in weight. Materials such as aluminum, magnesium, or titanium, or alloys thereof may be used. The element 20 has a central bore 30 which is preferably a sliding fit on the body 16. Thus when it is desired to rapidly replace a wheel because of damage thereto or to its tire, the nut 18 may be unscrewed, and the axle element 14 withdrawn and replaced. The element 20 has stepped diameters providing a central enlargement 32, annular bearing supports 34 and 35, annular spoke ring element ways 36 and 37, and retaining seal ring element supports 38 and 39. The supports 34 and 35 are of lesser diameter than the central enlargement, producing bearing support shoulders indicated by reference character 40 (FIG. 3), which align the bearings and prevent inward lateral movement thereof. The ways 36 and 37 are of lesser diameter than the supports 34 and 35 thereby providing spoke ring element way shoulders indicated by reference character 42 (FIG. 3) which help align the spoke ring elements with a running fit. The retaining seal ring element supports 38 and 39 are of lesser diameter than the ways 34 and 35 forming retaining seal ring element support shoulders 44 (FIG. 3), which align the ring elements 28 and 29 and prevent their binding the spoke ring elements 26 and 27, assuring free running of the wheels (not shown) as well as proper protective sealing.

The bearings 22 and 23 are of any suitable low friction type, preferably ball bearings having inner and outer races 45 and 46 and seals 47 and 48. This type of bearing has a self contained supply of lubricant suitable for the life of the bearing. The inner races 45 are a fixed press fit on the supports 34 and 35.

The housing element 24 is in the form of a cylinder with a slightly constricted central portion 50 which provides two bearing outer race engaging flanges 51 and 52 which are a fixed press fit on the races 46. The shoulders 53 and 54 maintain alignment, while the peripheral edges of the flanges 51 and 52 are a fixed press fit into correspondingly sized and positioned grooves 55 and 56 in the wheel or spoke ring elements 26 and 27.

The wheel or spoke ring elements 26 and 27 may be provided near their peripheral edges 60 and 61 with circularly arranged holes 62 and 63 adapted to receive the inner end of spokes (not shown). Other types of wheel construction can be used and the elements 26 and 27 can be extended to form open or closed disc wheels in themselves.

The inner faces of the ring elements 26 and 27 where they meet the outer lateral surfaces of the outer bearing races 46 are a close press fit making a seal thereat while said inner faces of the ring elements 26 and 27 where they meet the outer lateral surfaces of the inner bearing races 45 are a free running fit. The innermost surfaces in the central holes of the ring elements 26 and 27 are a free running fit. The outer faces of the ring elements 26 and 27 are provided with annular outer grooves 64 and 65 which are adapted to receive in a free running fit the annular lips 66 and 67 of the retaining seal ring elements 28 and 29. The outer lateral surfaces of the ring elements 26 and 27 where they meet the inner lateral surfaces of the retaining seal ring elements 28 and 29 are a free running fit.

The retaining seal ring elements 28 and 29 are made of suitable material such as aluminum, nylon or fine grain sintered bronze or stainless steel. In the latter case, they may be grease soaked so as to repel water and supply additional lubrication. The ring elements 28 and 29 are a fixed press fit on the axle sleeve element.

It may thus be seen that I have provided novel and useful improved wheel hub and axle construction which is free running, giving long trouble-free service, even under adverse and dirty weather and track conditions.

I wish it to be understood that I do not desire to be limited to the exact details of construction shown and described for obvious modifications will occur to a person skilled in the art to which the present invention relates.

I claim:
1. Wheel hub and axle construction comprising: an axle element; an axle sleeve element non-rotatably mounted on said axle element and having three shoulders forming an annular bearing support, an annular spoke ring element way, and a retaining seal ring element support; a spoke ring element rotatably mounted on said axle sleeve element at said way; and a retaining seal ring element fixedly mounted on said seal ring element support; said spoke ring element having an outwardly disposed annular groove therein, said retaining seal ring element having an annular inwardly directed lip extending into said groove and disposed in free running relationship therewith, forming a lubrication seal.

2. Wheel hub and axle construction comprising: an axle element; an axle sleeve element non-rotatably mounted on said axle element; said sleeve element at each of the ends thereof having three shoulders forming an annular bearing support, an annular spoke ring element way, and a retaining seal ring element support; a pair of spoke ring elements rotatably mounted on the axle sleeve element at the said ways; and a pair of retaining seal ring elements fixedly mounted on the seal ring element supports; said spoke ring elements each having an outwardly disposed annular groove therein, said retaining seal ring elements each having an annular inwardly directed lip extending into the groove of one of said spoke ring elements and disposed in free running relaitonship therewith, forming a seal.

References Cited in the file of this patent

UNITED STATES PATENTS

| | | |
|---|---|---|
| 590,713 | Warwick | Sept. 28, 1897 |
| 612,879 | Sobey | Oct. 25, 1898 |
| 1,414,270 | Fry et al. | Apr. 25, 1922 |
| 1,697,052 | Cunniff et al. | Jan. 1, 1929 |
| 1,793,190 | Philips | Feb. 17, 1931 |
| 1,921,445 | Van Derhoef | Aug. 8, 1933 |
| 2,443,982 | Gurley | June 22, 1948 |
| 2,568,834 | Streifthau | Sept. 25, 1951 |

FOREIGN PATENTS

| | | |
|---|---|---|
| 14,155 | Great Britain | 1896 |
| 663,982 | France | Apr. 16, 1929 |
| 765,697 | France | Mar. 26, 1934 |
| 476,967 | Great Britain | Dec. 20, 1937 |
| 839,603 | Germany | May 23, 1952 |